United States Patent [19]

Fearing

[11] 4,209,924
[45] Jul. 1, 1980

[54] MARKING TAG

[75] Inventor: D. David Fearing, Mahtomedi, Minn.

[73] Assignee: Fearing Manufacturing Co., Inc., South St. Paul, Minn.

[21] Appl. No.: 927,990

[22] Filed: Jul. 26, 1978

[51] Int. Cl.² .......................... A01K 11/00; G09F 3/06
[52] U.S. Cl. ...................................................... 40/301
[58] Field of Search ............... 40/301, 300, 302, 21 R

[56] References Cited

U.S. PATENT DOCUMENTS

| 2,325,906 | 8/1943 | Claffey | 40/302 |
| 3,260,007 | 7/1966 | Hayes | 40/301 |
| 3,550,295 | 12/1970 | Anania | 40/21 R |
| 3,837,101 | 9/1974 | Young | 40/21 R |
| 4,060,922 | 12/1977 | Reggers | 40/302 |
| 4,102,073 | 7/1978 | Hayes | 40/301 |

FOREIGN PATENT DOCUMENTS 2308877 8/1974 Fed. Rep. of Germany ............. 40/301

Primary Examiner—John F. Pitrelli
Attorney, Agent, or Firm—Jacobson and Johnson

[57] ABSTRACT

A two-piece ear tag for identifying animals with the first piece having a first part with a flat portion containing an identifying indicia wherein with the first part connected to a second part also containing an identifying indicia by a severable section, and the second piece having an anchoring pin with a sharp tip for piercing the animal's ear and extending into locking engagement in an opening in the first piece of the tag.

14 Claims, 11 Drawing Figures

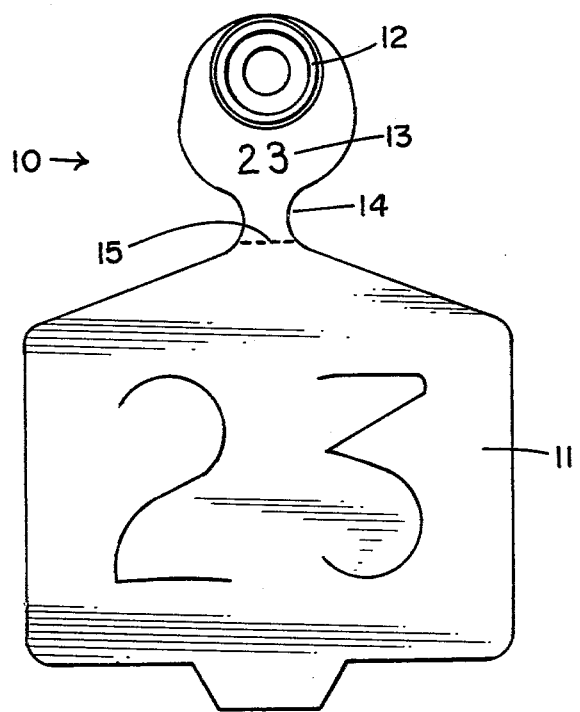
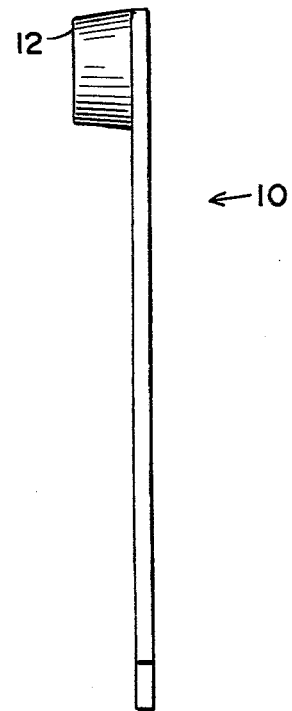
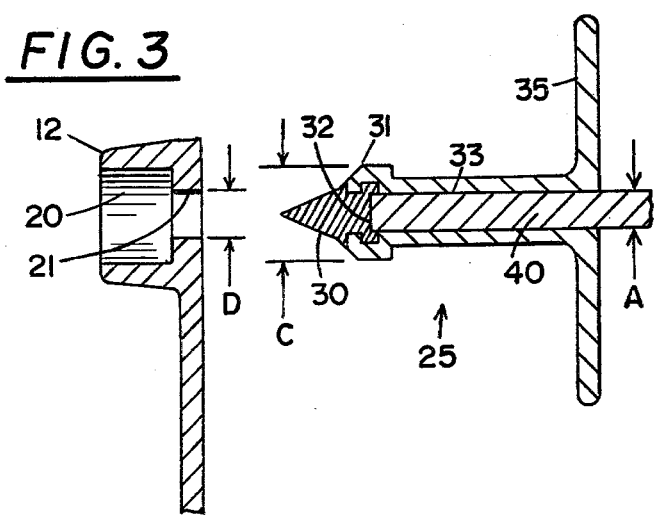
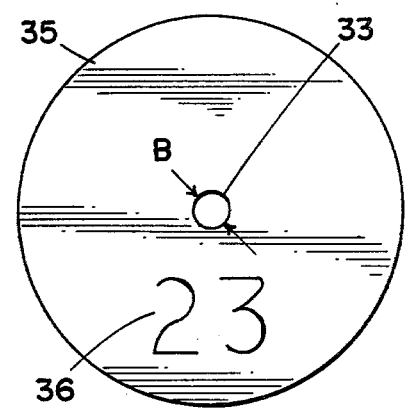

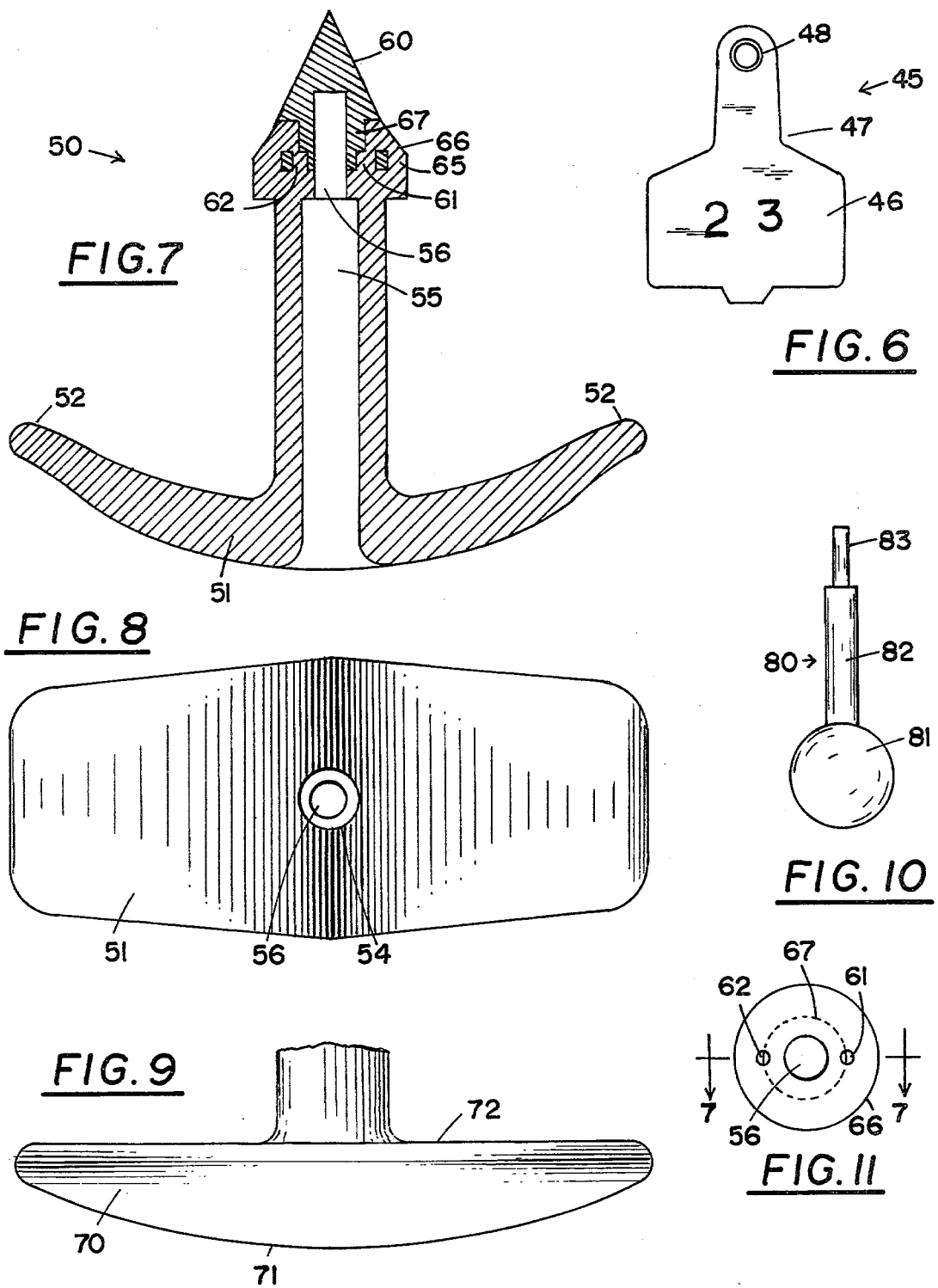

MARKING TAG

BACKGROUND OF THE INVENTION

1. Field of the Invention

This invention generally relates to animal ear tags and, more specifically, to two-piece animal ear tags that can be inserted through the ear of an animal.

2. Description of the Prior Art

Briefly, the concept of two-piece prior art ear tags is well known in the art. A typical example of prior art ear tags is shown in the Hayes U.S. Pat. No. 3,260,007. Hayes shows an animal tag and a pin for attaching the tag to the ear of an animal with the tag formed of a resilient material and a solid cylindrical pin formed of a less resilient material. The solid pin has a conical point for piercing the animal's ear and a shoulder for locking into a second portion of the tag.

The Goldberg U.S. Pat. No. 2,940,199 shows a two-piece tag comprising a female and a coacting male part. The female part is provided with an aperture and the male part is provided with a stem and hemispherical head adapted to be force fitted into the aperture in the female part by flexing the female part. Goldberg's tag attaches to an animal's ear through a prepared hole in the animal's ear. The Goldberg tag is made of polystyrene or polyethylene.

The Nichols U.S. Pat. No. 1,347,868 is a two-piece animal identification tag comprising a first member having a tubular shank which forms an annular cutting edge. The tubular shank pierces the animal's ear and is riveted to a washer-like collar.

The Murphy et al U.S. Pat. No. 3,731,414 shows a two-piece ear tag having a female part and a male part with a hollow stem having a tip of hard plastic with a hole therein for cutting through the animal's ear. A guide pin and a reusable back plate support the hollow stem as it penetrates the animal's ear. The female portion has a boss with a hole for inserting the hollow stem into the hole. Be closing the jaws of the applicator, the spike and stem of the first component are forced through the ear of the animal and through the hole in the second component. By opening of the jaws of the applicator the rigid pin and back plate are removed from within the hollow stem leaving the hollow stem connected to the female portion of the tag.

Another prior art identification tag is shown in the Schofield U.S. Pat. No. 3,184,874. The Schofield patent shows an animal identification tag comprising a pin of rigid material having sharp points on opposite ends. Two tags of synthetic resin are located on opposite ends of the pin. The pin has sharp points at the opposite ends which project beyond the tags. Annular grooves extend around the end portions of the pin and spaced from adjacent points to define a neck of reduced diameter which forms interlocking relationship with the tags.

The Brierley prior art U.S. Pat. No. 3,214,856 shows a two-piece animal identification tag comprising a pair of tabs which lie flat one on each side of the part of the animal to which the tag is attached. One of the tabs has a sharp spike which passes through the animal's ear. The other part of the tag has a hole to receive the spike with the head of the spike locking in the hole to prevent withdrawal of the spike from the hole. Both the spike and the hole are offset from the center of the tab so the tab swings around to disengage from any entanglements.

BRIEF SUMMARY OF THE INVENTION

Briefly, the present invention comprises a two-piece ear tag with one embodiment having identification indicia on at least two portions of the tag and a breakaway section connecting the main portion of the identification tag to the fastening portion of the tag. The attachment portion of the tag includes a flanged impaler comprised of two materials, a first hard material for impaling the animal's ear, and a second flexible flange and shaft that projects through the ear to interlock the two-piece ear tag together on opposite sides of the animal's ear.

DESCRIPTION OF THE DRAWING

FIG. 1 is a front view of an animal identification tag;

FIG. 2 is a side view of the animal identification tag;

FIG. 3 is a sectional view of the top portion of the animal identification tag;

FIG. 4 is a sectional view of the soft flanged impaler for fastening the tag to the animal's ear;

FIG. 5 is a back view of the retaining head of the soft flanged impaler;

FIG. 6 is a front view of an alternate embodiment of an animal identification tag;

FIG. 7 is a sectional view of an alternate embodiment of a soft flanged impaler;

FIG. 8 is an end view of an alternate embodiment of of the soft flanged impaler;

FIG. 9 is a side view of an alternate embodiment of a retaining head for my soft flanged impaler;

FIG. 10 is a tool which is used for inserting my soft flanged impaler into the animal's ear; and FIG. 11 is a rear view of impaler 60.

DESCRIPTION OF THE PREFERRED EMBODIMENT

Referring to FIGS. 1 and 2, reference numeral 10 generally designates one piece of a two-piece animal identification tag made from a soft pliable material such as polyurethane. Tag 10 comprises a flat section 11 containing a large identification number 23 and a connecting section containing an identification number 23. A narrow neck 14 connects section 11 to section 13. Located on neck 14 is a perforation line 15, i.e., a partial cut or weakened line that extends across neck 14. The purpose of perforation line 15 is to provide a weak spot that allows the lower portion of tag 11 to separate from the top portion of tag 11. The separation feature prevents injury and maintains animal identification in the event the animal snags the larger lower section of the tag. While a weakened section is achieved by perforations, it is also possible to have a weakened section by other means such as a narrow neck having an hour glass configuration. Instead of tearing the entire tag from the ear and injuring the animal's ear as well as losing the animal identification number, the tag separates into two parts. Perforation line 15 sufficiently weakens the connection between the top and bottom portion so that a pull on the bottom portion could not pull the tag out of the animal's ear without separating tag 10 into two parts. Yet, under normal usage, the bottom portion will remain intact with the top portion. The top portion of tag 10 includes a fastening shoulder 12 for engagement with a soft flanged impaler.

FIGS. 3, 4 and 5 show the relationship of the two-piece tag prior to fastening. Tag 10, which is shown in cross section, has a first opening 20 and a second opening 21 of diameter D. Typically, tag 10 is comprised of a soft, flexible polyurethane. A flanged impaler 25 includes a hollow cylindrical section with a hard conical impaler tip 30 located on one end of a hollow cylindrical passage 33. Conical impaler tip 30 operates to pierce the ear of an animal while hollow cylindrical passage 33 provides an opening for a blunt tipped forcing tool 40. Typically, conical impaler 30 may be made from a material such as nylon or the like, however, other suitable materials which have sufficient rigidity to cut an animal's ear are also suitable. A softer material 35 such as polyurethane forms a circular retaining head 35. The purpose of the softer material is to flex with the animal's ear and minimize the possibility of the animal snagging the tag. Conical impaler tip 30 fastens at the end of hollow cylindrical passage 33 through interlocking lips 31. The rear portion of conical impaler tip 30 includes a cylindrical recess 32 that forms axial alignment and circumferential engagement with tool 40. That is, tool 40 not only provides a rigid member for transmitting an axial force to the conical impaler 30 but a means for maintaining the axial alignment of conical impaler 30 with tool 40. Tool 40 may be part of a pliers or have a screw driver type handle that an operator can use to force conical impaler tip 30 through the animal's ear.

Typical of the designated dimensions A, B, C, and D in the two-part tag are as follows: A = ⅛ inch; B = ⅛ inch; C = 5/16 of an inch; and D = 11/64 of an inch. With these dimensions an ear tag can be attached to the animal through the animal's ear providing a two-part tag that fastens securely thereto. Note, that the outside dimension of the tool 40 is substantially the same as the inside dimension of the hollow cylindrical stem. This allows the operator to frictionally force tool 40 into the soft polyurethane and thus frictionally hold the impaler on the tool while inserting and assemblying the tag on the animal's ear.

The dimensions C and D are such that the soft flanged impaler 30 and the opening 21 must be deformed for the flanges on the impaler to pass through opening 21 and into a position where the rear portion of the flanged impaler can lockingly abut against the flat surface 28 inside shoulder 12.

To insure positive animal identification under conditions other than complete removal of the animal identification tag, the two-piece tag contains three areas for identifying number or the like. The first area is the flat panel 11 containing a large number which is visible from long range. The second area is section 13 containing a smaller number and the third area is section 36 also containing a smaller identifying number. The last two areas provide identification from the front or back of the animal's ear in the event section 11 is torn off.

Referring to FIG. 6, reference numeral 45 generally designates an alternate embodiment of an animal identification tag. Tag 45 comprises a flat section 46 containing a section for an animal identification numeral 23 and a neck 47 that connects section 46 to locking shoulder 48. The construction of tag 45 is identical to the construction of tag 10 with the exception that neck 46 does not contain a perforated tear-away section. The alternate embodiment is for applications where the nontearaway feature may be preferred over the tear-away feature of tag 10. However, if the tear-away feature is desired, the neck of tag 46 could be notched or weakened.

FIGS. 7 and 8 show an alternate embodiment of impaler 50. Flanged impaler, which is designated by reference numeral 50, comprises a hard conical tip 60 which is similar to the embodiments shown in FIG. 4. However, conical tip 60 includes a recess 56 for receiving a tool that extends substantially into the conical impaler tip. The purpose of extending opening 56 into conical impaler tip 60 is to prevent bending of conical tip 60 and the neck of flanged impaler as the unit is inserted through the animals ear. In addition, a flange 66 on the impaler contains a first opening 61 and a second opening 62 that allow the molten urethane to flow through openings 61 and 62 to lock conical tip 60 to head 65 of impaler 50. FIG. 11 shows a rear view of only conical impaler tip 60 which reveals opening 61 and 62 in conical impaler tip 60.

The retaining head of impaler 50 contains a curved section 51 and slightly tapered ends 52 for engagement with the animal's ear. FIG. 8 shows the rectangular shape of the rotating head and the different size openings 55 and 56 for receiving an insertion tool. The purpose of having a rectangular rather than a round head is to provide a scouring action on the animal's ear. That is, in certain locations flies lay eggs on the ear under the retaining head. If the head is an elongated shape, the rotation of the tag will scour the ear to prevent any buildup of fly larva under the rotating head of the tag.

Referring to FIG. 9, reference numeral 70 identifies an alternate head which has a rectangular shape, but which has a cross section 70 with a flat surface 72 and a curved or bowed section 71. The purpose of the central bow is to provide a stiffer portion at the retaining head at the end points. However, it should be understood that different shape heads, such as oval, are within the scope of my invention.

Referring to FIG. 10, reference numeral designates a typical tool 80 which may be used to insert the impaler into the animal's ear. Tool 80 comprises a handle 81, a first shaft 82 of constant diameter and a second shaft 83 of smaller diameter extending therefrom. Shaft 82 and 83 mate with opening 55 and opening 56 in impaler tip 50 to form axial support for inserting conical impaler tip 60 into the animal's ear. Although a hand-held tool is shown, other tools such as pliers or power tools could be used for inserting the impaler into an animal's ear.

While the conical tip has been described as being made from nylon; other suitable materials, such as glass filled urethane, are also suitable.

I claim:
1. An animal identification tag comprising:
   a first portion comprised of a flexible material and including an area for an animal identification indicia;
   a second portion comprised of a flexible material and including an area for an animal identification indicia, attachment means on said second portion for connecting said second portion to an animal's ear;
   said attachment means includes a flanged impaler for fastening said animal identification tag to the animal's ear;
   said flanged impaler comprising two materials, a first softer material for fastening through the animal's ear and a second harder material for penetrating the animal's ear; and
   a neck connecting said first portion to said second portion with said neck having a region sufficiently weakened so that in the event an animal snags said first portion said first portion separates from said second portion without pulling said second portion from the animal's ear.

2. The invention of claim 1 wherein said flanged impaler includes a conical impaling tip interlocked with a hollow member.

3. The invention of claim 2 wherein said flanged impaler includes a passage and recess for forming axial alignment with an assembly tool.

4. The invention of claim 3 wherein said flanged impaler passage is of substantially the same diameter as the assembly tool so that said flanged impaler frictionally grips said assembly tool to facilitate assembly of said animal identification tag to an animal's ear.

5. The invention of claim 4 wherein said fastening means includes a third area for an animal identification indicia.

6. The invention of claim 5 wherein said neck having a region sufficiently weakened comprises a perforation line.

7. The invention of claim 6 wherein said conical impaling tip comprises nylon.

8. The invention of claim 7 wherein said first and second portion of said animal identification tag comprises polyurethane.

9. The invention of claim 8 wherein said flanged impaler contains a flange for abutting and locking said flanged impaler to said animal identification tag to thereby prevent accidental removal of said flanged impaler from said attachment means on said second portion.

10. An animal identification tag comprising:
a first portion comprised of a flexible material and including an area for an animal identification indicia;
a second portion comprised of a flexible material, attachment means on said second portion for connecting said second portion to an animal's ear;
said second portion of said flexible material including an expandable opening of diameter D for receiving and forming locking engagement with a flanged impaler said second portion including a protective shield for a flanged impaler located therein; and
a flanged impaler for fastening said animal identification tag to an animal's ear, said flanged impaler having a shaft and a solid tip for piercing the animal's ear, said tip having a front and a back with said front having a solid section of sufficient hardness so that application of force directly to said tip forces said tip to pierce through an animal's ear, said shaft having a passage for frictional engagement of a tool and said back of said tip having a recess therein whereby said passage is located in axial alignment with said recess in said tip, said recess extends sufficiently far into said tip so that one can mount said flanged impaler on a tool to axially transmit a force to said tip of said flanged impaler to thereby force said flanged impaler through an animal's ear and into interlocking engagement with said attachment means on said second portion; and
said flanged impaler having a head of maximum diameter C where C is substantially larger than D so that insertion of said impaler into said opening of diameter D produces an interlocking relationship between said impaler and said second portion to thereby lock said flanged impaler and said second portion to an animal's ear.

11. The invention of claim 10 wherein said tip includes means for internally locking said tip to said shaft.

12. The invention of claim 12 wherein the recess in said tip and the opening in said shaft are of different dimensions.

13. The invention of claim 10 wherein said tip comprises glass filled urethane.

14. The invention of claim 13 wherein said tip has a conical tip.

* * * * *

UNITED STATES PATENT OFFICE
CERTIFICATE OF CORRECTION

Patent No. 4,209,924            Dated July 1, 1980

Inventor(s) D. David Fearing

It is certified that error appears in the above-identified patent and that said Letters Patent are hereby corrected as shown below:

In the Claims, column 6, line 29, claim 12, change "12", second occurrence, to --11--.

Signed and Sealed this

Third Day of February 1981

[SEAL]

*Attest:*

*Attesting Officer*

RENE D. TEGTMEYER

*Acting Commissioner of Patents and Trademarks*

REEXAMINATION CERTIFICATE (404th)

United States Patent [19]

Fearing

[11] B1 4,209,924

[45] Certificate Issued Oct. 22, 1985

[54] MARKING TAG

[75] Inventor: D. David Fearing, Mahtomedi, Minn.

[73] Assignee: Fearing Manufacturing Co., Inc., South St. Paul, Minn.

Reexamination Request:
No. 90/000,156, Feb. 8, 1982

Reexamination Certificate for:
Patent No.: 4,209,924
Issued: Jul. 1, 1980
Appl. No.: 927,990
Filed: Jul. 26, 1978

Certificate of Correction issued Feb. 3, 1981.

[51] Int. Cl.⁴ ................... A01K 11/00; G09F 3/06
[52] U.S. Cl. ........................................... 40/301
[58] Field of Search ................... 40/301, 302, 21 R

[56] References Cited

U.S. PATENT DOCUMENTS

| | | | |
|---|---|---|---|
| 3,260,007 | 7/1966 | Hayes | 40/301 |
| 3,731,414 | 5/1973 | Murphy et al. | 40/301 |
| 3,812,859 | 5/1974 | Murphy et al. | 128/330 |

FOREIGN PATENT DOCUMENTS

| | | | |
|---|---|---|---|
| 7023278 | 2/1972 | France | 40/301 |
| 7505925 | 9/1976 | France | 40/301 |

*Primary Examiner*—Hugh R. Chamblee

[57] ABSTRACT

A two-piece ear tag for identifying animals with the first piece having a first part with a flat portion containing an identifying indicia wherein with the first part connected to a second part also containing an identifying indicia by a severable section, and the second piece having an anchoring pin with a sharp tip for piercing the animal's ear and extending into locking engagement in an opening in the first piece of the tag.

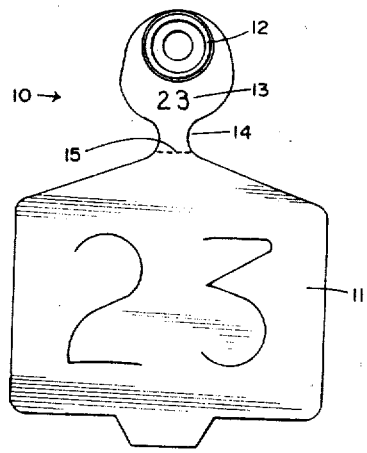

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-9 is confirmed.

Claims 10-14 are cancelled.

* * * * *